United States Patent [19]

Seltzer et al.

[11] Patent Number: 4,876,300

[45] Date of Patent: * Oct. 24, 1989

[54] POLYOLEFIN COMPOSITIONS STABILIZED WITH LONG CHAIN N,N-DIALKYLHYDROXYLAMINES

[75] Inventors: Raymond Seltzer, New City; Ramanathan Ravichandran, Yonkers; Ambelal R. Patel, Ardsley, all of N.Y.

[73] Assignee: Ciba-Geigy Corporation, Ardsley, N.Y.

[*] Notice: The portion of the term of this patent subsequent to May 20, 2003 has been disclaimed.

[21] Appl. No.: 139,408

[22] Filed: Dec. 30, 1987

[51] Int. Cl.$^4$ ................................................ C08K 5/32
[52] U.S. Cl. ........................................ 524/100; 524/99; 524/102; 524/103; 524/236; 524/291
[58] Field of Search ............... 524/236, 99, 100, 102, 524/103, 101

[56] References Cited

U.S. PATENT DOCUMENTS

| | | | |
|---|---|---|---|
| 3,222,334 | 12/1965 | Demme | 260/84.7 |
| 3,341,487 | 9/1967 | Albert et al. | 260/29.7 |
| 3,408,422 | 10/1968 | May | 524/236 |
| 3,644,244 | 2/1972 | Fryd et al. | 524/236 |
| 3,644,278 | 2/1972 | Klemchuk | 524/236 |
| 3,770,847 | 11/1973 | Lengnick et al. | 260/827 |
| 3,778,464 | 12/1973 | Klemchuk | 524/236 |
| 4,242,224 | 12/1980 | Dean, II et al. | 524/236 |
| 4,298,678 | 11/1981 | McKeever | 430/281 |
| 4,316,996 | 2/1982 | Collonge et al. | 568/784 |
| 4,409,408 | 10/1983 | Miller | 585/3 |
| 4,547,532 | 10/1985 | Bodnarski et al. | 523/122 |
| 4,590,231 | 5/1986 | Seltzer et al. | 524/101 |

OTHER PUBLICATIONS

L. A. Harris et al., J. Am. Oil Chemists Soc. 43, 11 (1966).

*Primary Examiner*—Veronica P. Hoke
*Attorney, Agent, or Firm*—Luther A. R. Hall

[57] ABSTRACT

Long chain N,N-dialkylhydroxylamines represent particularly valuable process stabilizers for polyolefin compositions. The hydroxylamine derived from di(hydrogenated tallow)amine is particularly useful for this purpose. These long chain N,N-dialkylhydroxylamines are very resistant to extraction from polyolefin compositions.

31 Claims, No Drawings

POLYOLEFIN COMPOSITIONS STABILIZED WITH LONG CHAIN N,N-DIALKYLHYDROXYLAMINES

This invention pertains to polyolefin compositions stabilized with long chain N,N-dialkylhydroxylamines.

BACKGROUND OF THE INVENTION

U.S. Pat. Nos. 3,644,278 and 3,778,464 describe the use of N,N-dibenzylhydroxylamine and selected other substituted hydroxylamines as stabilizers for polypropylene. There is no mention of the N,N-dialkylhydroxylamines as possible stabilizers for such polyolefin compositions in these patents.

U.S. Pat. No. 4,590,231 describes the use of hydroxylamines including the N,N-dialkylhydroxylamines as stabilizers for polyolefin compositions. The N,N-dialkylhydroxylamines are described generically as having alkyl of 1 to 18 carbon atoms and N,N-dioctylhydroxylamine is specifically disclosed as useful in such compositions. There is no mention of the longer chain N,N-dialkylhydroxylamines which are the subject of this invention. The stabilized polyolefin compositions described in this patent also contain an alkaline metal salt of a fatty acid and a phenolic antioxidant. The compositions may optionally also contain a hindered amine light stabilizer or an organic phosphorus compound.

U.S. Pat. No. 3,408,422 describes the stabilization of unsaturated polyester compositions using various hydroxyl amines. N,N-Dialkylhydroxylamines of 1 to 12 carbon atoms are generically described. Only N,N-diethylhydroxylamine, N-methyl-N-amylhydroxylamine and N,N-dibutylhydroxylamine are mentioned.

U.S. Pat. No. 3,644,244 describes the use of hydroxylamines including the N,N-dialkylhydroxylamines as stabilizers to prevent the gelation of organosols of butadiene/acrylonitrile graft copolymers. N,N-Dialkylhydroxylamines of 2 to 12 carbon atoms are generically disclosed, but only N,N-diethylhydroxylamine is specifically mentioned.

U.S. Pat. No. 4,242,224 describes the use of dialkylhydroxylamines to reduce or retard the pink discoloration found in amine antioxidant and antiozonant emulsions used in the rubber industry. N,N-Dialkylhydroxylamines of 2 to 12 carbon atoms are again generically disclosed, but only N,N-diethylhydroxylamine is specifically mentioned.

U.S. Pat. No. 4,316,996 pertains to the use of hydroxylamine compounds which can prevent the discoloration of phenolic antioxidants in rubber compositions. N,N-Dialkylhydroxylamines of 1 to 18 carbon atoms are generically described, but once again only N,N-diethylhydroxylamine is specifically mentioned.

U.S. Pat. No. 4,547,532 pertains to the use of hydroxylamines to prevent the premature increase in viscosity of polymer-based antifouling paints containing an organotin compound. N,N-Dialkylhydroxylamines of 1 to 20 carbon atoms are generically described, but only N,N-dimethylhydroxylamine, N,N-diethylhydroxylamine and N,N-dibutylhydroxylamine are specifically disclosed.

U.S. Pat No 4,409,408 discloses the use of N,N-dialkylhydroxylamines and tertiary alkylcatechols in stabilizing vinyl aromatic compounds, such as styrene, against premature polymerization. N,N-Dialkylhydroxylamines of 2 to 10 carbon atoms are generically disclosed. N,N-Didecylhydroxylamine is specifically mentioned, but not exemplified and the preferred N,N-dialkylhydroxylamines are of 2 to 6 carbon atoms.

L. A. Harris et al., J. Am. Oil Chemists Soc., 43, 11 (1966) specifically discloses N,N-dioctylhydroxylamine, N,N-didecylhydroxylamine and N,N-didodecylhydroxylamine. These hydroxylamines are shown to have antioxidant activity in squalene.

U.S. Pat. No. 3,770,847 discloses N,N-didodecylhydroxylamine. The hydroxylamines of this patent are disclosed as curing catalysts for organopolysiloxane compositions. The lower alkyl hydroxylamines are superior for this purpose.

U.S. Pat. No. 4,298,678 pertains to photosensitive compositions which contain substituted hydroxylamines. N,N-Diethylhydroxylamine is the preferred embodiment, but N,N-ditetradecylhydroxylamine is disclosed and N,N-didodecylhydroxylamine is exemplified in such compositions.

None of these references describes the very long chain N,N-dialkylhydroxylamines of over 14 carbon atoms nor does any of said references suggest that the long chain N,N-dialkylhydroxylamines of the instant invention exhibit special properties not possessed by the lower alkyl N,N-dialkylhydroxylamines which are usually the preferred embodiments in the cited prior art.

OBJECTS OF THE INVENTION

One object of the instant invention is to provide a stabilized polyolefin composition containing a long chain N,N-dialkylhydroxylamine which N,N-dialkylhydroxylamine is an excellent process stabilizer for said polyolefin when processed at elevated temperatures.

Another object of the instant invention is to provide a stabilized polyolefin composition containing a long chain N,N-dialkylhydroxylamine which composition is resistant to extraction of the hydroxylamine stabilizer.

DETAILED DISCLOSURE

The instant invention pertains to long chain N,N-dialkylhydroxylamines which are exceptionally effective process stabilizers for polyolefins and which are resistant to extraction from polyolefin compositions.

The instant long chain N,N-dialkylhydroxylamines are of the formula $$T_1T_2NOH$$

wherein $T_1$ and $T_2$ are independent alkyl of 12 to 18 carbon atoms.

Preferably $T_1$ and $T_2$ are independently dodecyl, tetradecyl, hexadecyl, heptadecyl or octadecyl. Most preferably $T_1$ and $T_2$ are the alkyl mixture found in hydrogenated tallow amine.

Compounds of special interest are those where $T_1$ and $T_2$ are each dodecyl, tetradecyl, hexadecyl or octadecyl; or where $T_1$ is hexadecyl and $T_2$ is tetradecyl, heptadecyl or octadecyl; or where $T_1$ is heptadecyl and $T_2$ is octadecyl.

A typical di(hydrogenated tallow)amine has the following distribution of alkyl substituents:

|  | $T_1T_2NH$  | |
| --- | --- | --- |
| $T_1$ | $T_2$ | % |
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |

| | $T_1T_2NH$ | |
|---|---|---|
| $T_1$ | $T_2$ | % |
| $C_{18}$ | $C_{18}$ | 39.0 |
| | other | 4.0 |

It is clear that the di(hydrogenated tallow)amine originating from animal sources may well vary somewhat in the specific distribution of alkyl substituents, but the di(hydrogenated tallow)amine contains major amounts of N,N-dihexadecylamine, N,N-dioctadecylamine and N-hexadecyl-N-octadecylamine. The individual components of the mixture can be separated by distillation under high vacuum.

However, for the purposes of this invention, there is no need to carry out such separation and the hydroxylamine prepared from the di(hydrogenated tallow)amine represents a preferred embodiment of the present invention.

The instant long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of the secondary amine to an alpha, beta-unsaturated compound such as an alkyl acrylate to form a Michael addition product, which is in turn oxidized to the corresponding tertiary amine oxide using aqueous hydrogen peroxide, and followed by the elimination of the alpha,-beta-unsaturated compound by the Cope reaction to give the N,N-dialkylhydroxylamine; (c) the metathesis reaction between an alkyl halide and a hydroxylamine in the presence of alkali such as sodamide; and (d) the reaction of an amine with a peroxy compound, such as benzoyl peroxide, followed by saponification of the intermediate formed to the desired hydroxylamine derivative.

The intermediates used for these synthetic methods are chiefly items of commerce.

N,N-Dialkylhydroxylamines have been known to have some beneficial stabilization effects in a variety of organic substrates including polymers as witnessed by the earlier cited prior art references.

However, the stabilization of polymers which are processed at elevated temperatures remains a serious practical problem. This is typified by the processing of polyolefins such a polyethylene and polypropylene.

The instant invention is to stabilized compositions which comprise (a) a saturated polyolefin or mixture thereof, and (b) a stabilizing amount of a long chain N,N-dialkylhydroxylamine of the formula

$T_1T_2NOH$ wherein $T_1$ and $T_2$ are independently alkyl of 12 to 18 carbon atoms.

The N,N-dialkylhydroxylamines are described in detail above. The most preferred $T_1$ and $T_2$ is the alkyl mixture found in hydrogenated tallow amine.

The polyolefin of the instant compositions is a homopolymer or copolymer of an alpha-olefin.

The saturated polyolefins useful in the instant compositions are the polymers derived from monoolefins, such as polyethylene, which can be crosslinked, polypropylene, polyisobutylene, polybutene-1, poly-3-methylbutene-1 and poly-4-methylpentene-1. Polyethylene may be for example medium density, high density or linear low density polyethylene.

Mixtures of the homopolymers cited above, for example mixtures of polypropylene and polyethylene, polypropylene and polybutene-1, or polypropylene and polyisobutylene and the like, may also be used.

Copolymers of monoolefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

The instant compositions particularly employ as the polyolefin component polyethylene, polypropylene, polyisobutylene, poly(butene-1), poly(pentene-1), poly(3-methylbutene-1), poly(4-methylpentene-1) and various ethylene and propylene copolymers.

Especially preferrred polyolefin substrates are polypropylene, low density polyethylene, medium density polyethylene, high density polyethylene, linear low density polyethylene, poly(butene-1), ethylene/vinyl acetate copolymer, ethylene/propylene copolymer and copolymers of ethylene or of propylene with higher alpha olefins.

The most preferred polyolefin substrate polypropylene, high density polyethylene, ethylene/propylene copolymer or a copolymer of ethylene or of propylene with another alpha olefin, low density polyethylene or linear low density polyethylene.

The polyolefins used in the food wrapping industry are of particular interest in these compositions.

The Food and Drug Administration (FDA) requires that any stabilizers or additives used in food packaging resist being extracted or otherwise lost from the packaging material into the food it is supposed to protect. Thus additives which are highly volatile or which can migrate easily or which are extracted by the food from the packaging material are unattractive however efficacious the additive may be as a stabilizer. Extraction studies are often carried out with heptane and with 50% aqueous ethanol which simulate the kinds of food often used in packaged food.

While higher molecular weight materials are generally less volatile and less soluble in solvents, the instant long chain N,N-dialkylhydroxylamines showed unexpected superiority in resisting extraction using 50% aqueous ethanol from a polypropylene plaque compared to the lower chain N,N-dialkylhydroxylamines of the prior art.

It is found that the instant long chain N,N-dialkylhydroxylamines are excellent process stabilizers for polyolefins when used alone in the absence of any phenolic antioxidant or even in the absence of any calcium stearate or other alkaline metal salt of a fatty acid.

In general, the hydroxylamine stabilizers of this invention are employed from about 0.01 to about 5% by weight of the stabilized composition although this will vary with the particular substrate and application. An advantageous range is from about 0.025 to about 2%, and especially 0.05 to about 1%.

The hydroxylamines of this invention stabilize polyolefins especially during high temperature processing with relatively little change in color and melt flow values even though the polymer may undergo a number of extrusions.

The stabilized polyolefin compositions of the instant invention may also contain a stabilizing amount of a stabilizer or mixture of stabilizer selected from the group consisting of the alkaline metal salts of fatty acids, the phenolic antioxidants, the hindered amine light stabilizers, the ultraviolet light absorbers, the organic phosphorus compounds, and the thiosynergists.

The stabilized polyolefin compositions may also contain other conventional additives including the metal deactivators, pigments, colorants, dyes, talc and other fillers.

Additionally, it is found that the instant long chain N,N-dialkylhydroxylamines are excellent process stabilizers for polyolefins when used in the presence of (c) an alkaline metal salt of a fatty acid and in the absence of any other stabilizer.

The alkaline metal salts of a fatty acid useful in the instant compositions are the alkali metal, alkaline metal earth metal, zinc, cadmium or aluminum salts of the higher fatty acids, for example calcium stearate, zinc stearate, magnesium behenate, sodium ricinoleate or potassium palmitate. Calcium stearate or zinc stearate are particularly preferred.

The instant compositions may contain from 0.01 to 2% of the alkaline metal salt of a fatty acid, preferably 0.05 to 1%, and especially 0.1 to 0.5% by weight of the stabilized composition.

Another embodiment of the instant invention pertains to the instant compositions which additionally contain both (c) an effective amount of an alkaline metal salt of a fatty acid and (d) an effective amount of a phenolic antioxidant.

Still another embodiment of the instant invention involves the instant compositions which additionally contain (c) an effective amount of an alkaline metal salt of a fatty acid and (e) an effective amount of a hindered amine light stabilizer.

Another embodiment of the instant invention pertains to the instant compositions which additionally contain (c) an effective amount of an alkaline salt of a fatty acid, (d) an effective amount of a phenolic antioxidant and (e) an effective amount of a hindered amine light stabilizer.

Still another embodiment of the instant invention pertains to the instant compositions which additionally contain (e) an effective amount of a hindered amine light stabilizer.

Another embodiment of the instant invention involves the instant compositions which additionally contain (c) an effective amount of an alkaline salt of a fatty acid, (d) an effective amount of a phenolic antioxidant and (f) an effective amount of an organic phosphorus compound.

Still another embodiment of the instant invention relates to the instant compositions which additionally contain (f) an effective amount of an organic phosphorus compound.

Another embodiment of the instant invention pertains to the instant compositions which additionally contain (c) an effective amount of an alkaline salt of a fatty acid and (f) an effective amount of an organic phosphorus compound.

Still another embodiment of the instant invention involves the instant compositions which additionally contain (e) an effective amount of a hindered amine light stabilizer and (f) an effective amount of an organic phosphorus compound.

Another embodiment of the instant invention pertains to the instant compositions which additionally contain (c) an effective amount of an alkaline salt of a fatty acid, (e) an effective amount of a hindered amine light stabilizer and (f) an effective amount of an organic phosphorus compound.

Still another embodiment of the instant invention relates to the instant compositions which additionally contain (c) an effective amount of an alkaline salt of a fatty acid, (d) an effective amount of a phenolic antioxidant, (e) an effective amount of a hindered amine light stabilizer and (f) an effective amount of an organic phosphorus compound.

Another embodiment of the instant invention involves the instant compositions which additionally contain (d) an effective amount of a phenolic antioxidant.

The preferred long chain N,N-dialkylhydroxylamines of formula $T_1T_2NOH$ used in these embodiments of the instant invention as well as the preferred alkaline metal salts of the fatty acids are described above. The preferred phenolic antioxidants, the preferred hindered amine light stabilizers and the preferred organic phosphorus compounds are set forth below.

The instant stabilizers may be readily incorporated into the polyolefins by conventional techniques at any convenient stage prior to the manufacture of shaped articles therefrom. For example, the stabilizer may be mixed with the polymer in dry powder form, or a suspension or emulsion of the stabilizer may be mixed with a solution, suspension or emulsion of the polymer. The stabilized polyolefin compositions of the invention may optionally also contain from about 0.01 to about 5%, preferably from about 0.025 to about 2%, and especially from about 0.1 to about 1%, by weight of various conventional additives, such as the materials listed below, or mixtures thereof.

The following may be mentioned as examples of further additives that can be used in the instant compositions.

The phenolic antioxidants useful in the instant compositions embrace a large family of compounds examples of which are given below.

Antioxidants

Simple 2,6-dialkylphenol, such as, for example, 2,6-di-tert.-butyl-4-methylphenol, 2-tert.-butyl-4,6-dimethylphenol, 2,6-di-tert.-butyl-4-methoxymethylphenol 2,6-dioctadecyl-4-methylphenol and 2,6-di-tert-butylphenol.

Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxyanisole, tris-(3,5-di-tert.-butyl-4-hydroxyphenyl) phosphite, 3,5-di-tert.-butyl-4-hydroxyphenyl stearate and bis-(3,5-di-tert.-butyl-4-hydroxyphenyl) adipate.

Hydroxylated thiodiphenyl ethers, such as, for example, 2,2'-thio-bis-(6-tert.-butyl-4-methylphenol), 2,2'-thio-bis(4-octylphenol), 4,4'-thio-bis-(6-tert.-butyl-3-methylphenol), 4,4'-thio-bis-(3,6-di-sec.-amylphenol), 4,4'-thio-bis-(6-tert.butyl-2-methylphenol) and 4,4'-bis-(2,6-dimethyl-4-hydroxy phenyl) disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di(3-tert.-butyl-5-methyl-2-hydroxybenzyl)4-methylphenol, 2,2'-methylene-bis-[4-methyl-6-(alpha-methylcyclohexyl)-phenol], 1,1-bis(3,5-dimethyl-2-hydroxyphenyl)butane, 1,1-bis-(5-tert.-butyl-4-hydroxy-2-methylphenyl)butane, 2,2-bis-(3,5-di-tert.-butyl-4-hydroxyphenyl)propane, 1,1,3- tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)pentane and ethylene bis-[3,3-bis-(3-tert.-butyl-4-hydroxy-phenyl)butyrate].

O-, N- and S-benzyl compounds, such as, for example, 3,5,3′,5′-tetra-tert.-butyl-4,4′-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.butyl-3-hydroxy-2,6-dimethylbenzyl) dithioterephthalate.

Hydroxybenzylated malonates, such as for example, dioctadecyl 2,2-bis-(3,5-di-tert.-butyl-2-hydroxybenzyl)malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)phenyl]2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert.butyl-4-hydroxybenzyl)-2,3,5,6-tetramethylbenzene and 2,4,6-tri(3,5-di-tert.-butyl-4-hydroxybenzyl)-phenol.

s-Triazine compounds, such as, for example, 2,4-bis-octylmercapto-6-(3,5-di-tert.-butyl-4-hydroxy-anilino)-s-triazine, 2-octylmercapto-4,6-bis-(3,5-di-tert.-butyl-4-hydroxy-anilino)-s-triazine, 2-octylmercapto-4,6-bis(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine, 1,3,5-tris-(2,6-dimethyl-3-hydroxy-4-tert.-butylbenzyl) isocyanurate and 1,3,5-tris-(3,5-di-tert.-butyl-4-hydroxybenzyl) isocyanurate.

Amides of β-(3,5-di-tert.-butyl-4-hydroxyphenyl)propionic acid, such as, for example, 1,3,5-tris-(3,5-di-tert.-butyl-4 hydroxyphenyl-propionyl)-hexahydro-s-triazine and N,N′-di(3,5-di-tert.-butyl-4-hydroxyphenyl-propionyl)-hexamethylene-diamine. N,N′-bis-β(3,5-di-t-butyl-4-hydroxyphenyl)-propionyl-hydrazine.

Esters of β-(3,5-di-tert.-butyl-4-hydroxyphenyl)pro-pionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of β-(5-tert.-butyl-4-hydroxy-3-methylphenyl)propionic acid with monohydric or polyhydric alcohols, such as, for example, with methanol, ethanol, octadecanol, 1,6-hexane-diol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

Esters of 3,5-di-tert.-butyl-4-hydroxyphenylacetic acid with monohydric or polyhydric alcohols, such as for example, with methanol, ethanol, octadecanol, 1,6-hexandiol, 1,9nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol, trimethylolethane, trimethylolpropane, tris-hydroxyethyl isocynurate and 4-hydroxymethyl-1-phospha-2,6,7-trioxabicyclo[2.2.2]-octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate, dioctadecyl tert.-butyl-4-hydroxy-3-methylbenzylphosphonate, and calcium bis(O-ethyl 3,5-di-tert butyl-4-hydroxybenzylphosphonate).

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-noctadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2′-ethylidene-bis(4,6-di-tertbutylphenol), 1,3,5-tris(2,6-dimethyl-4-tert-butyl-3hydroxybenzyl)isocyanurate, 1,1,3-tris(2-methyl-4-hydroxy-5-tert-butylphenyl)butane, 1,3,5-tris[2-(3,5-di-tertbutyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert.butyl-4-hydroxyhydrocinnamate), 1-(3,5-di-tert-butyl-4-hydroxyanilino)-3,5-di(octylthio)-s-triazine, N,N′-hexamethylene-bis(3,5-di-tert-butyl-4hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N′-bis[2-(3,5-di-tert-butyl-4-hydroxyhydrocinnamoyloxy)ethyl]-oxamide and 3,6-dioxaoctamethylene bis (3,5-di-tert-butyl-4-hydroxyhydrocinnamate).

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2′-ethylidene-bis(4,6-di-tert-butylphenol) or calcium bis(O-ethyl 3,5-di-tert-butyl-4-hydroxybenzylphosphonate).

When the instant compositions contain an organic phosphorus compound, such compounds may be for example, triphenyl phosphite, diphenylalkyl phosphites, phenyldialkyl phosphites, tri-(nonylphenyl) phosphite, tri-lauryl phosphite, trioctadecyl phosphite, 3,9-di(isodecyl-oxy)-2,4,8,10-tetraoxa-3,9-diphospha-[5.5]-undecane and tri-(4-hydroxy-3,5-di-tert.butylphenyl) phosphite or similar phosphonites.

The organic phosphorus compound of particular interest is selected from the group consisting of tris(2,4-di-tertbutylphenyl) phosphite, 3,9-di(2,4-di-tert-butyl-phenoxy)2,4,8,10-tetraoxa-3,9-diphospha[5.5]undecane, tris(p-nonyl-phenyl) phosphite, 3,9-di(2,6-di-tert-butyl-4-methyl-phenoxy) -2,4,8,10-tetraoxa-3,9-diphospha[5.-5]undecane, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)-ethyl)-phenoxy]-2,4,8,10-tetraoxa3,9-diphospha[5.5]-undecane and tetrakis(2,4-di-tert-butylphenyl)-4,4′-bis(diphenylene) phosphonite. Tris(2,4-di-tert-butylphenyl) phosphite is especially preferred.

When the instant compositions contain a thiosynergist, such thiosynergists may be for example dilauryl thiodipropionate, distearyl thiodipropionate or neopentanetetrayl tetrakis(3-dodecylthiopropionate). Distearyl thiodipropionate or dilauryl thiodipropionate is particularly preferred.

When the instant compositions contain a hindered amine light stabilizer, such hindered amines may for example be 4-benzoyl-2,2,6,6-tetramethylpiperidine, 4-stearyloxy-2,2,6,6-tetramethylpiperidine, bis-(2,2,6,6-tetramethylpiperidyl)sebacate or 3-n-octyl-7,7,9,9-tetramethyl-1,3,8-triaza-spiro[4.5]decane-2,4-dione.

The hindered amine light stabilizer of particular interest is selected from the group consisting of bis(2,2-6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, tris(2,2,6,6-tetramethylpiperidin-4-yl) nitrilotriacetate, 1,2-bis(2,2,6,6-tetramethyl-3-oxopiperazinn-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis-(amino-2,2,6,6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethyl-piperidin-4-yl)-amino-s-triazin-2yl]-1,10-diamino-4,7-diazadecane, octamethylene bis(2,2,6,6-tetramethylpiperidin-4-carboxylate) and 4,4'-ethylenebis(2,2,6,6-tetra-methylpiperazin-3-one).

A most preferred hindered amine light stabilizer is bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis-(amino-2,2,6,6-tetramethylpiperidine) or N,N',N'',N'''-tetrakis[(4,6-bis(butyl-(2,2,6,6-tetramethyl-piperidin-4-yl)amino)-s-triazine-2-yl]-1,10-diamino-4,7-diazadecane.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

UV-Absorbers 2-(2'-Hydroxyphenyl)-benzotriazoles, e.g., the 5'-methyl-, 3',5'-di-tert.-butyl-, 5'-tert.-butyl-, 5'(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-alpha-methyl-benzyl-5'-methyl, 3'-alpha-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodeoyloxy-benzoyl)-benzene.

Esters of optionally substituted benzoic acids, e.g., phenyl salicylate, octylphenyl salicylate, dibenzoylresorcin, bis-(4-tert.-butylbenzoyl)-resorcin, benzoylresorcin, 3,5-di-tert.-butyl-4-hydroxybenzoic acid 2,4-di-tert.-butyl-phenyl ester or 2-octadecyl ester or 2-methyl-4,6-di-tert.-butyl ester.

Acrylates, e.g., alpha-cyano-$\beta$,$\beta$-diphenylacrylic acid-ethyl ester or isooctyl ester, alpha-carbomethoxycinnamic acid methyl ester, alpha-cyano-$\beta$-methyl-p-methoxycinnamic acid methyl ester or -butyl ester or N($\beta$-carbomethoxyvinyl)-2-methyl-indoline.

Oxalic acid diamides, e.g., 4,4'-di-octyloxy-oxanilide, 2,2'-di-octyloxy-5,5'-di-tert.-butyl-oxanilide, 2,2'-di-dodecyloxy-5,5'di-tert.-butyl-oxanilide, 2-ethoxy-2'-ethyl-oxanilide, N,N'-bis(3-dimethylaminopropyl)-oxalamide, 2-ethoxy-5-tert.-butyl-2'-ethyl-oxanilide and the mixture thereof with 2-ethoxy-2'-ethyl-5,4'-di-tert.-butyl-oxanilide, or mixtures of ortho- and para-methoxy- as well as of o- and p-ethoxy-disubstituted oxanilides.

Preferably the ultraviolet light absorber useful in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-di-tert-butyloxanilide.

The following may be mentioned as examples of further additives that can be used in the instant compositions.

Metal deactivators, e.g., oxanilide, isophthalic acid dihydrazide, sebacic acid-bis-phenylhydrazide, bis-benzylidene-oxalic acid hydrazide, N,N'-diacetal-adipic acid dihydrazide, N,N'-bis salicyloyl-oxalic acid dihydrazide, N,N'-bis-salicyloyl-hydrazine, N,N'-bis-(3,5-di-tert.-butyl-4-hydroxyphenylpropionyl)-hydrazine, N-salicyloyl-N'-salicylalhydrazine, 3-salicyloyl-amino-1,2,4-triazole or N,N'-bis-salicyloyl-thiopropionic acid dihydrazide.

Nucleation agents, e.g., 4-tert.-butylbenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, antiozonants, lubricants such as stearyl alcohol, fillers, carbon black, asbestos, kaolin, talc, glass fibers, pigments, optical brighteners, flameproofing agents and antistatic agents.

While the stabilizers of this invention may be conveniently incorporated by conventional techniques into polyolefins before the fabrication thereof into shaped articles, it is also possible to apply the instant stabilizers by a topical application to the finished articles. This is particularly useful with fiber applications where the instant stabilizers ar applied topically to the fibers, for example, by way of a spin finish during the melt spinning process.

The following examples are presented for the purpose of illustration only and are not to be construed to limit the nature of scope of the instant invention in any manner whatsoever.

EXAMPLE 1

Methyl 3-[Di-(hydrogenated tallow)amino]propionate

A mixture of 49.4 grams (0.1 mol) of di(hydrogenated tallow)amine (eq. wt. of 494 grams/mol) and 9 ml (0.1 mol) of methyl acrylate are heated to reflux. Upon completion of the addition reaction, as determined by the complete disappearance of the starting amine by thin layer chromatography (TLC) analysis, the mixture is cooled. The volatiles are removed in vacuo to give 54.4 grams (94% yield) of the above-named product as a yellow oil. IR (methylene chloride) $V_{c=o}$ 1735 cm$^{-1}$.

Analysis: Calcd for $C_{38}H_{77}NO_2$: C, 78.7; H, 13.4; N, 2.4. Found: C, 78.8; H, 13.4; N, 2.4.

EXAMPLE 2

N,N-Di(hydrogenated tallow)hydroxylamine

Into a solution of 29 grams (0.05 mol) of the product of Example 1 in 200 ml of isopropanol is added 2.4 ml (0.063 mol) of 70% aqueous hydrogen peroxide solution. After stirring at 23°-25° C. for 1 hour, an additional 1.2 ml (0.031 mol) of a 70% aqueous hydrogen peroxide solution is added. After stirring for another 1 hour at 23°-25° C., another additional 1.2 ml (0.031 mol) of 70% aqueous hydrogen peroxide is added. After a total of 18 hours stirring at 23°-25° C., the product is isolated by filtration and washed with isopropanol to give 20.9 grams (82% yield) of white solid melting at 88°-90° C.

The product (19 grams) is recrystallized from 300 ml of isopropanol to give 13.1 grams (69% recovery) of the above-named product as a white solid melting at 93°-95° C.

Analysis: Calcd for $C_{34}H_{71}NO$: C, 80.1; H, 14.0; N, 2.8. Found: C, 80.0; H, 14.3; N, 2.9.

EXAMPLE 3

2-Ethylhexyl 3-[Di-(hydrogenated tallow)amino]propionate

Following the general procedure of Example 1, 52.2 grams (0.105 mol) of di(hydrogenated tallow)amine (eq. wt. of 494 gram/mol) and 18.4 grams (0.1 mol) of 2-ethylhexyl acrylate are reacted. The reaction product is purified by high pressure liquid chromatography (HPLC) using hexane and ethyl acetate solvents on silica gel to give 40.6 grams (60% yield) of the above-named product as a colorless oil. IR (methylene chloride) $V_{C=O}$ 1735 cm$^{-1}$.

EXAMPLE 4

N,N-Di(hydrogenated tallow)hydroxylamine

Using the general procedure of Example 2, 29.7 grams (0.044 mol) of the product of Example 3 in 125 ml of isopropanol is oxidized using 2.5 ml (0.065 mol) of 70% aqueous hydrogen peroxide to yield 16.3 grams (73% yield) of the above-named product as a white solid melting at 93°-96° C.

From the HPLC purification, using hexane and ethyl acetate solvents, of the filtrate, 4.4 grams (48% yield) of 2-ethylhexyl acrylate is recovered.

EXAMPLE 5

Methyl 3-(Didodecylamino)propionate

Following the general procedure of Example 1, 75 grams (0.21 mol) of didodecylamine and 19.1 ml (0.21) of methyl acrylate are reacted to give 92.6 grams (quantitative yield) of the above-named product as a yellow oil.

This oil (5.0 grams) is purified by column chromatography using hexane and ethyl acetate solvents on silica gel to give 4.9 grams (98% recovery) of a colorless oil.

Analysis: Calcd for $C_{28}H_{57}NO_2$: C, 76.5; H, 13.1; N, 3.2. Found: C, 76.6; H, 13.0; N, 3.1.

EXAMPLE 6

N,N-Didodecylhydroxylamine

Using the general procedure of Example 2, 87.6 grams (0.2 mol) of the product of Example 5 in 800 ml of isopropanol is oxidized using 9.7 ml (0.25 mol) of 70% aqueous hydrogen peroxide solution to give 32.1 grams (44% yield) of the above-named product as a white solid melting at 85°-86° C.

Analysis: Calcd for $C_{24}H_{51}NO$: C, 78.0; H, 13.9; N, 3.8. Found: C, 78.4; H, 13.5; N, 3.7.

EXAMPLE 7

Methyl 3-(Ditetradecylamino)propionate

Following the general procedure of Example 1, 50.4 grams (0.123 mol) of ditetradecylamine and 11.1 ml (0.123 mol) of methyl acrylate are reacted to give 62.6 grams (quantitative yield) of the above-named product as a yellow oil.

This oil (5.0 grams) is purified by column chromatography using hexane and ethyl acetate solvents on silica gel to give 4.9 grams of a colorless oil.

Analysis: Calcd for $C_{32}H_{65}NO_2$: C, 77.5; H, 13.2; N, 2.8. Found: C, 77.8; H, 13.4; N, 3.0.

EXAMPLE 8

N,N-Ditetradecylhydroxylamine

Using the general procedure of Example 2, 57.5 grams (0.116 mol) of the product of Example 7 in 450 ml of isopropanol is oxidized using 5.6 ml (0.15 mol) of 70% aqueous hydrogen peroxide solution to give 21.5 grams (44% yield) of the above-named product as a white solid melting at 94°-96° C.

Analysis: Calcd for $C_{28}H_{59}NO$: C, 79.0; H, 14.0; N, 3.3. Found: C, 79.2; H, 14.0; N, 3.2.

EXAMPLE 9

N,N-Di(hydrogenated tallow)hydroxylamine

Into a solution of 100 grams (0.18 mol) of di(hydrogenated tallow)amine (494 eq. wt., 90% secondary amine) in 400 ml of n-butanol at 55° C. is added 8.6 ml (0.22 mol) of 70% aqueous hydrogen peroxide solution. The reaction is complete when all the hydrogen peroxide is consumed as determined by titration of an aliquot of the reaction mixture with potassium iodide/sulfuric acid/sodium thiosulfate.

The above-named product is isolated from the reaction mixture by filtration. The filter cake is washed with two 50 ml portions of n-butanol at 55° C.; then dried to give the desired product in a yield of 63 grams (68%) as a white solid melting at 93°-96° C.

EXAMPLE 10

N,N-Di(hydrogenated tallow)hydroxylamine

Following the general procedure of Example 9, to a solution of 52.6 grams (0.09 mol) of di(hydrogenated tallow)amine (526 eq. wt, 90% secondary amine) dissolved in 200 ml of n-butanol at 55° C. is added 5.3 ml (0.14 mol) of 70% aqueous hydrogen peroxide solution. During the course of the reaction three additional 0.5 ml (0.01 mol) portions of 70% aqueous hydrogen peroxide solution are added after 22, 24 and 72 hours.

The progress of the reaction is followed by thin layer chromatography (TLC) (silica gel; chloroform/acetic acid 98/2). The reaction is complete when all the starting amine has disappeared as determined by the TLC analysis.

The above-named product is isolated from the reaction mixture by filtration. The filter cake is washed with 100 ml of n-butanol at 55° C., and then with two 200 ml portions of methanol at ambient temperature to give the desired product in a yield of 27.6 grams (57%) as a white solid melting at 98°-100° C.

EXAMPLE 11

N,N-Di(hydrogenated tallow)hydroxylamine

Following the general procedure of Example 9, to 200 grams (0.36 mol) of di(hydrogenated tallow)amine (494 eq. wt. 90% secondary amine) suspended in 800 ml of ethanol at 55° C. is added 29.4 ml (0.77 mol) of 70% aqueous hydrogen peroxide solution. After stirring for 18 hours at 55° C., the reaction mixture is filtered and the moist filter cake is recrystallized from 1000 ml of hexane. The recrystallized material is washed with 500 ml of hexane at 55° C. The above-named product is obtained in a yield of 123 grams (66%) as a white solid melting at 90°-93° C.

EXAMPLE 12

N,N-Dihexadecylhydroxylamine

The general procedure of Example 11 is followed using 100 grams (0.19 mol) of dihexadecylamine (451 eq. wt., 88% secondary amine, 30.2 grams (0.44 mol) of 50% aqueous hydrogen peroxide solution and 400 ml of ethanol. After stirring for 48 hours, the reaction mixture is filtered to give the above-named product which is twice recrystallized from 500 ml of chloroform. The desired product is obtained in a yield of 29.4 grams (32%) as white needles melting at 97°-99° C.

Analysis: Calcd for $C_{32}H_{67}NO$: C, 79.8; H, 14.0; N, 2.0. Found: C, 79.5; H, 14.0; N, 2.7.

EXAMPLE 13

N,N-Didodecylhdroxylamine

Following the general procedure of Example 12, to a solution of 50 grams (0.14 mol) of didodecylamine dissolved in 200 ml of n-propanol at 40° C. is added dropwise 9.62 grams (0.14 mol) of 50% aqueous hydrogen peroxide solution. After 72 hours at 40°-45° C., the reaction mixture is filtered to give a crude product which is subsequently recrystallized from 300 ml of hexane. The above-named product is obtained in a yield of 24.8 grams (48%) as white needles melting at 90°-92° C.

Analysis: Calcd for $C_{24}H_{51}NO$: C, 78,0; H, 13.9; N, 3.8. Found: C, 78.0; H, 14.2; N, 3.7.

EXAMPLE 14

N,N-Ditetradecylhydroxylamine

The general procedure of Example 12 is followed using at 50° to 55° C. 50 grams (0.12 mol) of ditetradecylamine, 200 ml of n-propanol and 8.3 grams (0.12 mol) of 50% aqueous hydrogen peroxide solution. The above-named product is obtained in a yield of 33.4 grams (64%) as white needles melting at 97°-99° C.

EXAMPLE 15

N,N-Di(hydrogenated tallow)hydroxylamine

To a suspension of 68 grams of anhydrous dibasic sodium phosphate and 25 grams of di(hydrogenated tallow)amine in 200 ml of dry tetrahydrofuran is added a solution of 12.8 grams of benzoyl peroxide in 100 ml of tetrahydrofuran over a 30-minute period. The resulting suspension is heated under reflux for 14 hours and then cooled to room temperature. The insoluble present is removed by filtration and the filtrate is concentrated under reduced pressure to give 35 grams of a pale yellow solid. Saponification of 12 grams of the benzoate prepared above with 1.89 grams of potassium hydroxide in 50 ml of tetrahydrofuran and 40 ml of methanol affords the compound mixture named in the title. Recrystallization of the crude material from isopropanol gives 7 grams of the title compound as a white solid melting at 95°-97° C.

Analysis: Calcd for $C_{34}H_{71}NO$: C, 80.1; H, 14.0; N, 2.8. Found: C, 80.2; H, 13.9; N, 2.7.

EXAMPLE 16

Process Stabilization of Polypropylene at 500° F. (260° C.)

The base formulation comprises 100 parts of unstabilized polypropylene (Profax 6501, Himont) with 0.10 parts of calcium stearate. The test stabilizer is solvent blended onto the propylene from a solution in methylene chloride. After removal of the solvent by evaporation under reduced pressure, the stabilized resin formulation is extruded at 100 rpm from a 1 inch (2.54 cm) diameter extruder at 500° F. (260° C.).

After each of the first, third and fifth extrusions, resin pellets are compression molded into 125 mil (3.2 mm) thick plaques at 380° F. (193° C.) and specimen yellowness index (YI) is determined according to ASTM D-1925. Low YI values indicate less yellowing. Additionally, the melt flow rate (in grams/10 minutes) according to ASTM D-1238 is measured on the pellets after the first and fifth extrusions. The closer the melt flow rate after the fifth extrusion is to the melt flow rate after the first extrusion indicates superior process stabilization of the polypropylene.

| Stabilizer* | Stab. Conc. % by wt | Yellowness Index Color After Extrusion | | | Melt Flow Rate After Extrusion | |
|---|---|---|---|---|---|---|
| | | 1 | 3 | 5 | 1 | 5 |
| Base Formulation | — | 3.3 | 3.1 | 3.5 | 5.3 | 29.3 |
| AO F | 0.025 | 4.5 | 5.0 | 5.6 | 4.0 | 12.6 |
| AO F | 0,05 | 5.5 | 7.3 | 7.6 | 3.7 | 7.6 |
| AO F | 0.1 | 5.7 | 7.7 | 10.0 | 2.6 | 5.7 |
| HA 5 | 0.025 | 2.4 | 2.8 | 3.3 | 2.2 | 4.4 |
| HA 5 | 0.05 | 2.6 | 3.4 | 3.8 | 1.9 | 3.6 |

-continued

| Stabilizer* | Stab. Conc. % by wt | Yellowness Index Color After Extrusion | | | Melt Flow Rate After Extrusion | |
|---|---|---|---|---|---|---|
| | | 1 | 3 | 5 | 1 | 5 |
| HA 5 | 0.1 | 2.8 | 3.6 | 4.3 | 1.8 | 3.0 |

*Base formulation contains 0.1% of calcium stearate
AO F is neopentanetetrayl tetrakis (3,5-di-tert-butyl-4-hydroxyhydrocinnamate)
HA 5 is N,N—di(hydrogenated tallow)hydroxylamine The instant N,N-dialkylhydroxylamine exhibits better process stabilization protection to the polypropylene in both resistance to discoloration and in resistance to polymer degradation than does the phenolic antioxidant.

EXAMPLE 17

Process Stabilization of Polypropylene at 550° F. (288° C.)

Following the general procedure described in Example 16, polypropylene (Spheripol 6301, Himont) containing 0.1% by weight of calcium stearate is extruded at 550° F. (288° C.) with various stabilizers test. The yellowness index values and melt flow rate values are determined as described in Example 16 to ascertain the efficacy of each stabilizer in protecting the polymer during this high temperature processing.

| Stabilizer* | Stab. Conc. % by wt | Yellowness Index Color After Extrusion | | | Melt Flow Rate After Extrusion | |
|---|---|---|---|---|---|---|
| | | 1 | 3 | 5 | 1 | 5 |
| Base Formulation | — | 4.6 | 8.6 | 10.6 | 20.8 | 83.2 |
| AO D | 0.05 | 3.3 | 5.1 | 8.1 | 14.6 | 38.5 |
| AO F | 0.05 | 4.6 | 11.2 | 11.4 | 17.3 | 31.0 |
| AO G | 0.05 | 9.4 | 12.9 | 10.7 | 18.1 | 57.8 |
| AO L | 0.05 | 6.8 | 11.5 | 10.1 | 21.7 | 53.3 |
| HA 5 | 0.025 | 1.0 | 1.7 | 2.1 | 15.0 | 26.3 |
| HA 5 | 0.05 | 1.5 | 2.0 | 2.6 | 13.1 | 21.4 |
| HA 5 | 0.1 | 1.1 | 2.3 | 3.1 | 12.4 | 17.2 |

*Base formulation contains 0.1% of calcium stearate
AO D is 2,6-di-tert-butyl-4-methylphenol
AO F is neopentanetetrayl tetrakis(3,5-di-tert-butyl-4-hydroxyhydrocinnamate)
AO G is 2,4,6-tris(3,5-di-tert-butyl-4-hydroxybenzyl)isocyanurate
AO L is n-octadecyl 3,5-di-tert-butyl-4-hydroxyhydrocinnamate
HA 5 is N,N—di(hydrogenated tallow)hydroxylamine The instant long chain N,N-dialkylhydroxylamine is far superior to the various phenolic antioxiants as a process stabilizer for polypropylene under these rigorous high temperature processing conditions.

EXAMPLE 18

Process Stabilization of Polypropylene at 500° F. (260° C.)

The results given in Example 16 show that the instant long chain N,N-dialkylhydroxylamine are excellent process stabilizers for polypropylene. The results given in Example 16 are obtained on polypropylene pellets. It is known that when polypropylene is fabricated into fiber form the requirements for efficacious stabilization are greatly increased. The greater surface area of the fiber structure enhances the opportunity for stabilizer loss by any number of mechanisms. Thus, any stabilizer which can perform effectively in a polypropylene fiber is clearly desired.

Following the general procedure described in Example 16 polypropylene (Profax 6301, Himont) containing 0.1% by weight of calcium stearate plus various test stabilizers is converted into pellets by extrusion at 500° F. (260° C.) and separately spun at 500° F. (260° C.) into filament (9–10 denier) form. The melt flow rate is determined for the pellets and for the corresponding fibers.

N,N-Dialkylhydroxylamines of various alkyl chain lengths are compared for their efficacy in protecting the polypropylene in these two product forms.

| Stabilizer* | Stabilizer Concentration % by wt | Melt Flow Rate (grams/10 minutes) | |
|---|---|---|---|
| | | Pellets | Fiber |
| Base Formulation | — | 14.0 | 45.2 |
| AO F | 0.05 | 11.5 | 42.4 |
| HA 1 | 0.1 | 9.8 | 46.2 |
| HA 1 | 0.25 | 10.3 | 25.4 |
| HA 1 | 0.5 | 10.0 | 21.2 |
| HA 4 | 0.1 | 10.6 | 17.9 |
| HA 4 | 0.25 | 9.4 | 15.3 |
| HA 6 | 0.1 | 10.5 | 20.8 |
| HA 6 | 0.2 | 9.3 | 18.6 |
| HA 5 | 0.1 | 10.4 | 18.1 |
| HA 5 | 0.25 | 9.6 | 16.0 |
| HA 5 | 0.5 | 9.4 | 15.4 |
| HA 7 | 0.1 | 10.0 | 17.7 |
| HA 7 | 0.25 | 10.0 | 15.0 |

*Base formulation contains 0.1% of calcium stearate
AO F is neopentanetetrayl tetrakis(3,5-di-tert-butyl-4-hydroxyhydrocinnamate)
HA 1 is N,N—diethylhydroxylamine
HA 4 is N,N—didodecylhydroxylamine
HA 5 is N,N—di(hydrogenated tallow)hydroxylamine
HA 6 is N,N—ditetradecylhydroxylamine
HA 7 is N,N—di(hydrogenated tallow)hydroxylamine containing a large amount of hexadecyl, heptadecyl and octadecyl components Each of the N,N-dialkylhydroxylamines provided stabilization protection to the polypropylene pellets even better than that provided by the phenolic antioxidant.

However, in the case of the polypropylene fiber where stabilization requirements are quite stringent, the instant long chain N,N-dialkylhydroxylamines are clearly superior to the lower chain N,N-dialkylhydroxylamines and to the phenolic antioxidant.

EXAMPLE 19

Process Stabilization of Polypropylene at 500° F. (260° C.)

Following the general procedure of Example 16, another polypropylene (El Paso PP) containing 0.1% of zinc stearate is stabilized with various test stabilizers. The effectiveness of each test stabilizer is measured by the determination of yellowness index and melt flow rate values on the test samples after extrusions at 500° F. (260° C.).

The instant long chain N,N-dialkylhydroxylamine provided equal or better stabilization as measured by melt flow rate, and significantly better resistance to discoloration as measured by yellowness values compared to the phenolic antioxidants.

| Stabilizer* | Stab. Conc. % by wt | Yellowness Index Color After Extrusion | | | Melt Flow Rate After Extrusion | |
|---|---|---|---|---|---|---|
| | | 1 | 3 | 5 | 1 | 5 |
| Base Formulation | — | 1.3 | 1.7 | 2.4 | 5.9 | 10.0 |
| AO F | 0.05 | 6.0 | 7.9 | 9.0 | 4.5 | 7.0 |
| AO F | 0.1 | 7.6 | 9.5 | 11.2 | 3.6 | 5.5 |
| AO M | 0.1 | 22.5 | 26.2 | 27.2 | 3.3 | 4.6 |
| HA 5 | 0.05 | 2.0 | 3.2 | 4.0 | 3.4 | 5.0 |

| | Stab.<br>Conc. | Yellowness Index<br>Color After Extrusion | | | Melt Flow Rate<br>After Extrusion | |
|---|---|---|---|---|---|---|
| Stabilizer* | % by wt | 1 | 3 | 5 | 1 | 5 |
| HA 5 | 0.1 | 2.7 | 3.8 | 4.6 | 3.5 | 4.7 |

*Base formulation contains 0.1% of zinc stearate
AO F is neopentanetetrayl tetrakis(3,5-di-tert-butyl-4-hydroxyhydrocinnamate)
AO M is 1,3,5-tris(3,5-di-tert-butyl-4-hydroxybenzyl)-mesitylene)
HA 5 is N,N—di(hydrogenated tallow)hydroxylamine

EXAMPLE 20

Process Stabilization of Polyethylene at 500° F. (260° C.)

Following the general procedure described in Example 16, linear low density polyethylene (MLD 003, Mobil) containing 0.1% by weight of calcium stearate is extruded at 500° F. (260° C.) in the presence of various test stabilizers. The efficacy of the test stabilizers is ascertained by determination of the yellowness index and melt flow rate values.

The instant long chain N,N-dialkylhydroxylamines provided comparable or better polymer stabilization as measured by melt flow rates, but far superior resistance to discoloration than the phenolic antioxidants.

| | Stab.<br>Conc. | Yellowness Index<br>Color After<br>Extrusion | | | Melt Flow<br>Rate After<br>Extrusion | |
|---|---|---|---|---|---|---|
| Stabilizer* | % by wt | 1 | 3 | 5 | 1 | 5 |
| Base<br>Formulation | — | −5.0 | −5.3 | −4.8 | 10.7 | 7.4 |
| AO F | 0.03 | 3.0 | 8.1 | 9.0 | 10.8 | 10.1 |
| AO L | 0.03 | −1.0 | 0.4 | 0.8 | 11.6 | 10.0 |
| HA 5 | 0.03 | −3.5 | −3.3 | −2.6 | 12.6 | 10.5 |

*Base formulation contains 0.1% of calcium stearate
AO F is neopentanetetrayl tetrakis(3,5-di-tert-butyl-4-hydroxyhydrocinnamate)
AO L is n-octadecyl 3,5-di-tert-butyl-4-hydroxyhydrocinnamate
HA 5 is N,N—di(hydrogenated tallow)hydroxylamine

EXAMPLE 21

Extraction of Polypropylene Plaques with 50% Ethanol

Propylene (Profax 6501, Himont) containing 0.1% by weight of calcium stearate, 0.033% by weight of neopentanetetrayl tetrakis-3,5-di-tert-butyl-4-hydroxyhydrocinnamate, 0.067% by weight of tris(2,4-di-tert-butylphenyl) phosphite and 0.25% by weight of a N,N-dialkylhydroxylamine test compound is extruded at 500° F. (260° C.). The extruded composition is then compression molded at 440° F. (227° C.) into a plaque having the dimensions of 1 inch×2 inch×30 mil (2.54 cm×5.08 cm×0.77 mm) and containing 1 gram of polypropylene.

The test plaques are extracted with 50 ml of 50% aqueous ethanol at 49° C. for 10 days after being exposed for an initial period of 2 hours in said solvent at 66° C. These extraction conditions conform to those required by the FDA in assessing the acceptability of additives for use in food packaging.

The concentration of the test additive in the plaques is determined using chemiluminescence based on nitrogen content. The sample plaques are analyzed by combusting a 200 mg sample in the furnace of an Antek chemiluminescence nitrogen analyzer with a programmed combustion from 120° C. to 700° C. The plaques are analyzed before and then after extraction with the 50% aqueous ethanol. A polypropylene plaque containing no nitrogen containing hydroxylamine additive is used as a blank. Analyses are done in quadruplicate with the average values reported in the table below.

| | Extractability of N,N—Dialkylhydroxylamines from Polypropylene into 50% Aqueous Ethanol | | |
|---|---|---|---|
| | Additive in Plaque in mg | | |
| Additive* | Before<br>Extraction | After<br>Extraction | Percent<br>Extracted |
| HA 8 | 2.61 | 1.63 | 38 |
| HA 4 | 1.86 | 1.53 | 18 |
| HA 6 | 2.37 | 2.05 | 14 |
| HA 5 | 2.50 | 2.42 | 3 |
| HA 7 | 2.46 | 2.41 | 2 |

*HA 4 is N,N—didodecylhydroxylamine
HA 5 is N,N—di(hydrogenated tallow)hydroxylamine
HA 6 is N,N—ditetradecylhydroxylamine
HA 7 is N,N—di(hydrogenated tallow)hydroxylamine containing a large amount of hexadecyl, heptadecyl and octadecyl components
HA 8 is N,N—didecylhydroxylamine These values are based on nitrogen concentrations after correcting for the nitrogen content of the blank.

Inspection of these data shows that the lower chain N,N-dialkylhydroxylamine such as N,N-didecylhydroxylamine exhibit high extractability into 50% aqueous ethanol. As the alkyl chain length is extended to a N,N-dialkylhydroxylamine rich in hexadecyl, heptadecyl and octadecyl components, the extractability falls precipitously to very low levels. There is a tremendous drop in extractability in going from the didecyl derivative to the didodecyl derivative, and another precipitous drop in extractability in going from the ditetradecyl derivative to the N,N-di(hydrogenated tallow)hydroxylamine.

EXAMPLE 22

Process Stabilization of Polypropylene at 500° F. (260° C.)

Following the general procedure given in Example 16, the efficacy of the instant long chain N,N-dialkylhydroxylamines in providing process stabilization to polypropylene in the absence of all other stabilizer additives is ascertained.

To unstabilizer polypropylene (Profax 6501, Himont), containing no other stabilizer additives, is added the various test stabilizers as seen on the table below. Yellowness index (YI) and melt flow rate (MFR) values are obtained to indicate the level of process stabilization afforded by said stabilizers.

| | Stab.<br>Conc. | Yellowness Index<br>Color After Extrusion | | | Melt Flow Rate<br>After Extrusion | |
|---|---|---|---|---|---|---|
| Stabilizer* | % by wt | 1 | 3 | 5 | 1 | 5 |
| Base<br>Formulation | — | ** | ** | ** | ** | ** |
| AO F | 0.1 | 9.1 | 10.9 | 11.9 | 3.8 | 7.3 |
| HA 5 | 0.05 | 2.7 | 3.8 | 4.4 | 3.4 | 6.5 |
| AO F plus<br>HA 5 | 0.1<br>0.05 | 3.1 | 5.8 | 7.8 | 3.3 | 6.1 |

*Base formulation contains only polypropylene without additives.
AO F is neopentanetetrayl tetrakis-(3,5-di-tert-butyl-4-hydroxyhydrocinnamate)
HA 5 is N,N—di(hydrogenated tallow)hydroxylamine
**YI and MFR values for polypropylene extruded without any additives present are very similar to those given in Example 16 where the polypropylene contains only 0.1% calcium stearate.

The instant long chain N,N-dialkylhydroxylamine affords better overall process stabilization for polypropylene than the use of a phenolic antioxidant alone particularly in respect to resistance to discoloration.

Surprisingly, the presence of the long chain instant N,N-dialkylhydroxylamines with other selected stabilizer additives results often in enhanced stabilization efficacy for said stabilizers in polypropylene in respect to light stabilization and/or oven aging. This "synergistic" effect is seen in the examples given below.

EXAMPLE 23

Following the general procedure of Example 18, fiber grade polypropylene containing 0.1% by weight of calcium stearate is compounded for 1.5 minutes at 220° C. to incorporate the test stabilizers listed below. The compounded polymer is then spun at 270° C. with a 3-minute residence time for the polymer in the spinning apparatus into a fiber tow of 37 filaments. The spun tow is stretched at a ratio of 1:3.2 to give a final tow with a denier of 130.

The fibers are exposed in a Xenotest 1200 (Fa. Heraeus) xenon arc weatherometer. The exposure time needed for the initial tensile strength of the fiber tow to fall to half it original value is the criterion used to assess failure in this test.

| Stabilizer* | Stabilizer Concentration % by weight | Time in Xenotest 1200 till initial tensile strength falls in half |
|---|---|---|
| HA 5 | 0.1 | 200 |
| HALS A | 0.2 | 1370 |
| HALS A plus HA 5 | 0.2<br>0.1 | 1630 |
| HALS A plus AO N | 0.2<br>0.1 | 1600 |
| HALS A plus AO N plus HA 5 | 0.2<br>0.1<br>0.1 | 1850 |

*Base polypropylene contains 0.1% by weight calcium stearate
HA 5 is N,N—di(hydrogenated tallow)hydroxylamine
HALS A is the polycondensation product of 2,4-dichloro-6-tert-octylamino-s-triazine and 4,4'-hexamethylene-bis(amino-2,2,6,6-tetramethylpiperidine)
AO N is calcium bis(O—ethyl 3,5-di-tert-butyl-4-hydroxybenzylphosphonate) mixed with wax in a 1:1 ratio In each case shown in the table above the instant hydroxylamine enhances the level of stabilization beyond that expected from the presence of the individual stabilizers present.

EXAMPLE 24

Following the general procedure of Examples 18 and 23, the effect of the presence of an instant hydroxylamine on enhancing the oxidative stability of polypropylene subjected to oven aging at 120° C., said polypropylene being stabilized by a phenolic antioxidant, is seen in the table below.

The stabilized composition always contains 0.1% by weight of calcium stearate. The polypropylene compounded as described in Example 23 is molded at 230° C. for 3 minutes to give plaques of 1 mm thickness. From these plaques strips (10 mm × 130 mm) are cut which are aged in an air circulating oven at 120° C. The test specimens are considered to have failed (embrittled) when they break when bended with a bending radius of 5 mm. The time in days to reach this embrittlement is recorded in the table below.

| Stabilizer* | Stab. Conc. % by wt | Days at 120° C. till Embrittlement |
|---|---|---|
| HA 5 | 0.1 | 2 |
| AO N | 0.2 | 9 |
| HA 5 plus AO N | 0.1<br>0.1 | 16 |

*Base polypropylene contains 0.1% by weight calcium stearate
HA 5 is N,N—di(hydrogenated tallow)hydroxylamine
AO N is calcium bis(O—ethyl 3,5-di-tert-butyl-4-hydroxybenzylphosphonate) mixed with wax in a 1:1 ratio The synergistic enhancement of oven aging in the presence of the instant hydroxylamine is quite significant nearly doubling the value obtained when the phenolic antioxidant is used alone.

EXAMPLE 25

Following the general procedure of Examples 18, 23 and 24, fiber grade polypropylene containing 0.1% by weight of calcium stearate and 0.011% of AO L is compounded with the various test stabilizers. A portion of the compounded polymer is directly molded at 230° C. for 3 minutes to give plaques of 1 mm thickness. Another portion of the compounded polymer is first spun at 270° C. into fibers. The fibers are then converted into plaques of 1 mm thickness. From these plaques, specimen strips are cut which are aged in an air circulating oven at 149° C. The test specimens are considered to be brittle when they break when bent with a radius of 5 mm. The time in days to reach this embrittlement is recorded in the table below.

| Stabilizer* | Stab. Conc. % by wt | Days to Embrittlement on Oven Aging at 149° C. | |
|---|---|---|---|
| | | Molded Directly into Plaques | Spun First then Molded into Plaque |
| HA 5 | 0.1 | <1 | <1 |
| HALS A | 0.2 | 6 | 1 |
| HALS A plus HA 5 | 0.1<br>0.1 | 11 | 7 |
| HALS A plus HA 5 | 0.05<br>0.1 | 7 | 3 |

*Base polypropylene contains 0.1% calcium stearate
HA 5 is N,N—di(hydrogenated tallow)hydroxylamine
HALS A is the polycondensation product of 2,4-dichloro-6-tert-octylamino-s-triazine and 4,4'-hexamethylene-bis(amino-2,2,6,6-tetramethylpiperidine)
AO L is n-octadecyl 3,5-di-tert-butyl-4-hydroxyhydrocinnamate It is clear that in respect to oven aging protection the combination of hindered amine stabilizer with an instant hydroxylamine greatly enhances the time till failure (embrittlement) occurs. The enhancement is particularly observed when the polypropylene composition is subjected to severe shear forces at high temperature as they occur in fiber spinning and injection molding.

EXAMPLE 26

Process Stabilization of Polypropylene at 500° F. (260° C.)

Following the procedure of Example 16, unstabilized polypropylene (Profax 6501, Himont) containing 0.1% by weight of calcium stearate is extruded at 500° F. (260° C.) with various test stabilizers and the specimen yellowness index (YI) and melt flow rate are determined to measure the efficacy of the stabilizers being tested. The results are given below.

| Stabilizer* | Stab. Conc. % by wt | Yellowness Index Color After Extrusion | | | Melt Flow Rate After Extrusion | |
|---|---|---|---|---|---|---|
| | | 1 | 3 | 5 | 1 | 5 |
| Base Formulation | — | 2.2 | 2.4 | 2.5 | 7.0 | 14.6 |
| AO F | 0.1 | 5.0 | 6.9 | 7.6 | 4.2 | 7.3 |
| HA 5 | 0.05 | 2.3 | 2.9 | 4.8 | 3.4 | 6.6 |
| AO F plus | 0.1 | | | | | |
| HA 5 | 0.05 | 2.0 | 2.2 | 4.4 | 3.0 | 5.3 |

*Base formulation contains 0.1% of calcium stearate
AO F is neopentanetetrayl tetrakis(3,5-di-tert-butyl-4-hydroxyhydrocinnamate)
HA 5 is N,N—di(hydrogenated tallow)hydroxylamine The instant N,N-dialkylhydroxylamine exhibits better process stabilization protection to the polypropylene in both resistance to discoloration and in resistance to polymer degradation than does the phenolic antioxidant. The combination of the instant N,N-dialkylhydroxylamine and phenolic antioxidant provides still better stabilization protection to the polypropylene.

EXAMPLE 27

Following the general procedure of Example 16, polypropylene (Profax 6501, Himont) containing 0.1% by weight of calcium stearate and 0.05% by weight of neopentanetetrayl tetrakis(3,5-di-tert-butyl-4-hydroxyhydrocinnamate) and the additional test additives indicated in the table below is extruded into pellets. The pellets are then pressed at 240° C. for 6 minutes to prepare the 1 mm test plaques.

The test plaques are then examined for color by the Yellowness Index (YI) method (ASTM D 1925) before aging or exposure to hot water. Separate plaques are then exposed to oven aging for 21 days at 120° C. or at 135° C.; or to exposure in water at 90° C. for 7, 14, 21, 28 or 35 days. Yellowness index values are obtained on each plaque after said exposure. The YI values are recorded in the table below. Low YI values indicate less yellowing or discoloration.

| Run | A | B | C | D | E | F |
|---|---|---|---|---|---|---|
| Extrusion Temp. °C. | 260 | 260 | 280 | 280 | 260 | 260 |
| *Phosphorus I (%) | 0.1 | 0.05 | 0.05 | 0.025 | — | — |
| *HA 5 (%) | — | — | 0.05 | 0.025 | 0.1 | 0.05 |
| Yellowness Index Values | | | | | | |
| Before aging | 1.4 | 1.2 | 0.8 | 1.1 | 0.8 | 0.7 |
| After exposure in water at 90° C. for | | | | | | |
| 7 days | 3.8 | 3.5 | 2.9 | 1.8 | 1.9 | 2.1 |
| 14 days | 6.3 | 5.4 | 2.6 | 2.3 | 3.3 | 2.8 |
| 21 days | 7.7 | 6.4 | 4.2 | 4.1 | 3.4 | 3.6 |
| 28 days | 10.2 | 7.2 | 2.0 | 2.0 | 2.7 | 2.3 |
| 35 days | 9.2 | 9.3 | 2.1 | 2.4 | 3.8 | 2.7 |
| After oven aging for 21 days | | | | | | |
| at 120° C. | 3.9 | 4.7 | 5.8 | 5.4 | 4.9 | 5.8 |
| at 135° C. | 10.0 | 10.8 | 9.6 | 9.5 | 10.9 | 10.3 |

*Phosphorus I is tris(2,4-di-tert-butylphenyl) phosphite
HA 5 is N,N—di(hydrogenated tallow)hydroxylamine The instant N,N-dialkylhydroxylamine provies far better protection against discoloration caused by oxidation in hot (90° C.) water than does the phosphite stabilizer. However, a 50/50 mixture of phosphite and hydroxylamine compounds provides still better resistance to discoloration in hot water (i.e. 90° C.).

EXAMPLE 28

Following the general procedure of Example 16, polypropylene (Propathene HF 26, ICI) containing 0.1% by weight of calcium stearate and containing various test additives indicated in the table below is extruded at 260° C. Melt flow rates and yellowness index values are measured after the 1st, 3rd and 5th extrusions to ascertain the effectiveness of the stabilizers present.

As inspection of the data given in the table shows, the combination of phenolic antioxidant, phosphite and the long chain N,N-dialkylhydroxylamine provides even better resistance to discoloration and to polymer degradation than does the antioxidant plus phosphite or does the hydroxylamine alone. There appears to be some synergistic effect caused by the concomitant use of antioxidant, phosphite and hydroxylamine together.

| Stabilizer* | Stab. Conc. % by wt | Yellowness Index Color After Extrusion | | | Melt Flow Rate After Extrusion | | |
|---|---|---|---|---|---|---|---|
| | | 1 | 3 | 5 | 1 | 3 | 5 |
| AO F plus | 0.075 | | | | | | |
| Phosphorus I | 0.075 | 4.8 | 5.9 | 7.8 | 2.3 | 3.1 | 3.6 |
| HA 5 plus | 0.075 | | | | | | |
| AO F plus | 0.0375 | 4.1 | 5.4 | 7.1 | 2.6 | 2.2 | 2.8 |
| Phosphorus I | 0.0375 | | | | | | |
| HA 5 | 0.15 | 4.0 | 6.0 | 8.1 | 2.4 | 2.9 | 3.4 |
| HA 5 plus | 0.075 | | | | | | |
| AO F plus | 0.025 | 3.8 | 5.2 | 7.8 | 2.0 | 2.5 | 2.6 |
| Phosphorus I | 0.05 | | | | | | |
| AO F plus | 0.05 | | | | | | |
| Phosphorus I | 0.1 | 4.8 | 6.3 | 8.3 | 3.0 | 3.0 | 3.2 |

*Polypropylene contains 0.1% by weight of calcium stearate
AO F is neopentanetetrayl tetrakis(3,5-di-tert-butyl-4-hydroxyhydrocinnamate)
Phosphorus I is tris(2,4-di-tert-butylphenyl) phosphite
HA 5 is N,N—di(hydrogenated tallow)hydroxylamine

EXAMPLE 29

Following the general procedure of Example 16, polypropylene (Spheripol, Himont) containing 0.1% by weight of calcium stearate and the additional stabilizers listed in the table below is extruded at 260° C. or at 280° C. The melt flow rate and yellowness index values are measured after the 1st, 3rd and 5th extrusions to assess the efficacy of the stabilizers present in the test sample.

When extrusion is done at 260° C., the formulations containing the hydroxylamine stabilize the melt flow rate values far better than the formulations containing only the hindered amine light stabilizer or only the hindered amine in combination with a phenolic antioxidant. There is a slight increase in color in the formulations containing the hydroxylamine component.

When extrusion is done at 280° C., the formulations containing the hydroxylamine component stabilize the melt flow rate tremendously better than the formulations without hydroxylamine, but some discoloration occurs concomitantly especially in the absence of a phenolic antioxidant.

| Stabilizer* | Stab. Conc. % by wt | Yellowness Index Color After Extrusion | | | Melt Flow Rate After Extrusion | | |
|---|---|---|---|---|---|---|---|
| | | 1 | 3 | 5 | 1 | 3 | 5 |
| | | Extrusion at 260° C. | | | | | |
| AO L plus | 0.05 | | | | | | |
| HALS A | 0.1 | 8.5 | 13.5 | 18.8 | 3.0 | 3.3 | 3.7 |
| AO L plus | 0.05 | | | | | | |
| HALS A plus | 0.1 | 4.3 | 5.2 | 7.3 | 3.2 | 3.7 | 4.3 |
| HA 5 | 0.1 | | | | | | |

-continued

| Stabilizer* | Stab. Conc. % by wt | Yellowness Index Color After Extrusion | | | Melt Flow Rate After Extrusion | | |
|---|---|---|---|---|---|---|---|
| | | 1 | 3 | 5 | 1 | 3 | 5 |
| HALS A | 0.1 | 11.7 | 21.7 | 33.2 | 2.2 | 2.6 | 2.7 |
| HALS A plus | 0.1 | | | | | | |
| HA 5 | 0.1 | 4.1 | 6.1 | 8.0 | 3.7 | 3.6 | 3.8 |
| Extrusion at 280° C. | | | | | | | |
| AO L plus | 0.05 | | | | | | |
| HALS A | 0.1 | 12.5 | 28.5 | 51.3 | 3.1 | 3.3 | 4.1 |
| AO L plus | 0.05 | | | | | | |
| HALS A plus | 0.1 | 4.8 | 7.6 | 10.6 | 3.9 | 3.6 | 4.2 |
| HA 5 | 0.1 | | | | | | |
| HALS A | 0.1 | 17.6 | 62.3 | 137.0 | 2.6 | 2.9 | 2.7 |
| HALS A plus | 0.1 | | | | | | |
| HA 5 | 0.1 | 7.4 | 7.2 | 9.7 | 2.7 | 4.1 | 4.4 |

*Polypropylene contains 0.1% by weight calcium stearate
AO L is n-octadecyl 3,5-di-tert-butyl-4-hydroxyhydrocinnamate
HALS A is the polycondensation product of 2,4-dichloro-6-tert-octylamino-s-triazine and 4,4'-hexamethylene-bis(amino-2,2,6,6-tetramethylpiperidine)
HA 5 is N,N—di(hydrogenated tallow)hydroxylamine Following the general procedure of Example 16, polypropylene (Propathene HF 26, ICI) containing 0.1% by weight of calcium stearate and the additional stabilizers listed in the table below is extruded at 300° C. The melt flow rate an yellowness inex values are measure after the 1st, 3rd and 5th extrusions to assess the efficacy of the stabilizers present in the test sample.

A mixture of phenolic antioxiant, phosphorus compound and hydroxylamine is very effective in stabilizing the melt flow rate value without perceptible discoloration.

| Stabilizer* | Stab. Conc. % by wt | Yellowness Index Color After Extrusion | | | Melt Flow Rate After Extrusion | | |
|---|---|---|---|---|---|---|---|
| | | 1 | 3 | 5 | 1 | 3 | 5 |
| AO F plus | 0.05 | | | | | | |
| HA 5 | 0.1 | 5.9 | 12.9 | 21.1 | 3.7 | 4.0 | 4.5 |
| AO F plus | 0.05 | | | | | | |
| HA 5 plus | 0.075 | 5.1 | 8.8 | 17.1 | 2.6 | 3.4 | 3.6 |
| Phosphorus I | 0.025 | | | | | | |
| AO F plus | 0.05 | | | | | | |
| HA 5 plus | 0.05 | 4.7 | 8.9 | 19.7 | 2.8 | 3.0 | 4.2 |
| Phosphorus I | 0.05 | | | | | | |
| AO F plus | 0.05 | | | | | | |
| HA 5 plus | 0.025 | 5.2 | 10.9 | 24.5 | 3.7 | 3.7 | 3.9 |
| Phosphorus I | 0.075 | | | | | | |
| AO F plus | 0.05 | | | | | | |
| Phosphorus I | 0.1 | 6.7 | 14.4 | 26.0 | 2.6 | 3.6 | 3.3 |

*Polypropylene contains 0.1% by weight of calcium stearate
AO F is neopentanetetrayl tetrakis(3,5-di-tert-butyl-4-hydroxyhydrocinnamate)
Phosphorus I is tris(2,4-di-tert-butylphenyl) phosphite
HA 5 is di(hydrogenated tallow)hydroxylamine

EXAMPLE 31

Following the general procedure of Example 16, linear low density polyethylene (Dowlex, Dow) containing 0.1% by weight of calcium stearate and the additional additives listed in the table below is extruded at 500° F. (260° C.). The yellowness index values are measured after the 1st and 5th extrusions as an assessment of the efficacy of the stabilizers present.

While both the phosphite and the hydroxylamine give better color to the extruded polyethylene, a combination of the phosphite and hydroxylamine is far superior to either additive used alone. Inspection of the data in the table below affirms this.

| Stabilizer* | Stab. Conc. % by wt. | Yellowness Index Color After Extrusion | | Yellowness Index Color After Extrusion | |
|---|---|---|---|---|---|
| | | 1 | 5 | 1 | 5 |
| | | Base formulation A* | | Base formulation B* | |
| Base formulation | — | 2.5 | 17 | −0.5 | 2.5 |
| Phosphorus I | 0.1 | 3.5 | 14 | 0.5 | 10 |
| HA 5 plus | 0.02 | | | | |
| Phosphorus I | 0.08 | −0.7 | 4.5 | −0.5 | 6 |
| HA 5 | 0.08 | | | | |
| Phosphorus I | 0.02 | 0.5 | 8 | −0.5 | 8.5 |
| HA 5 | 0.1 | 1.5 | 12 | 0 | 8 |

*Base formulation A contains 0.1% calcium stearate and 0.02% AO F
Base formulation B contains 0.1% calcium stearate and 0.04% AO L
AO F is neopentanetetrayl tetrakis(3,5-di-tert-butyl-4-hydroxyhydrocinnamate)
AO L is n-octadecyl 3,5-di-tert-butyl-4-hydroxyhydrocinnamate
Phosphorus I is tris(2,4-di-tert-butylphenyl) phosphite
HA 5 is N,N—di(hydrogenated tallow)hydroxylamine

What is claimed is:

1. A stabilized composition which comprises
    (a) a saturated polyolefin or mixture thereof, and
    (b) a stabilizing amount of a long chain N,N-dialkylhydroxyamine of the formula $$T_1T_2NOH$$

wherein $T_1$ and $T_2$ are independently alkyl of 16 to 18 carbon atoms.

2. A composition according to claim 1 wherein component (a) is a polyolefin which is a homopolymer or copolymer of an alpha-olefin.

3. A composition according to claim 2 wherein the polyolefin is selected from the group consisting of polypropylene, low density polyethylene, medium density polyethylene, high density polyethylene, linear low density polyethylene, poly(butene-1), ethylene/vinyl acetate copolymer, ethylene/propylene copolymer and copolymers of ethylene or of propylene with other alpha-olefins.

4. A composition according to claim 3 wherein the polyolefin is polypropylene, high density polyethylene, ethylene/propylene copolymer or a copolymer of ethylene or of propylene with another alpha-olefin, low density polyethylene or linear low density polyethylene.

5. A composition according to claim 1 where in component (b) $T_1$ and $T_2$ are independently dodecyl, tetradecyl, hexadecyl, heptadecyl or octadecyl.

6. A composition according to claim 1 where in component (b) $T_1$ and $T_2$ are the alkyl mixture found in hydrogenated tallow amine.

7. A composition according to claim 1 where in component (b) $T_1$ and $T_2$ are each hexadecyl or octadecyl.

8. A composition according to claim 1 where in component (b) $T_1$ is hexadecyl and $T_2$ is heptadecyl or octadecyl.

9. A composition according to claim 1 where in component (b) $T_1$ is heptadecyl and $T_2$ is octadecyl.

10. A composition according to claim 1 which additionally contains a stabilizing amount of a stabilizer or mixture of stabilizers selected from the group consisting of the alkaline metal salts of fatty acids, the phenolic antioxidants, the hindered amine light stabilizers, the ultraviolet light absorbers, the organic phosphorus compounds and the thiosynergists.

11. A composition according to claim 10 which additionally contains
(c) an effective amount of an alkaline metal salt of a fatty acid or mixture thereof.

12. A composition according to claim 11 wherein component (c) is calcium stearate, zinc stearate, magnesium behenate, sodium ricinoleate or potassium palmitate.

13. A composition according to claim 12 wherein component (c) is calcium stearate or zinc stearate.

14. A composition according to claim 10 which additionally contains
(c) an effective amount of an alkaline metal salt of a fatty acid or mixture thereof, and
(d) an effective amount of a phenolic antioxidant or mixture thereof.

15. A composition according to claim 14 wherein component (d) is a phenolic antioxidant selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), dinoctadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)iso-cyanurate, 1,1,3-tris(2-methyl-4-hydroxy-5-tert-butylphenyl)butane, 1,3,5-tris[2-(3,5-di-tertbutyl4-hydroxyhydrocinnamoyloxy)- ethyl]isocyanurate, 3,5-di-(3,5-di-tert-butyl-4-hydroxybenzyl)mesitol, hexamethylene bis(3,5-di-tert.butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl- 4-hydroxyhydrocinnamamide), calcium bis(O-ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2(3,5-di-tert-butyl-4-hydroxyhydrocinnamoyloxy)-ethyl]oxamide and 3,6-dioxaoctamethylene bis(3,5-di-tert-butyl-4hydroxyhydrocinnamate).

16. A composition according to claim 15 wherein component (d) is neopentane-tetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxy- benzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol) or calcium bis(O-ethyl 3,5-di-tert-butyl-4-hydroxybenzylphosphonate).

17. A compositon according to claim 10 which additionally contains
(e) an effective amount of a hindered amine light stabilizers or mixture thereof.

18. A composition according to claim 17 wherein component (e) is a hindered amine light stabilizer selected from the group consisting of bis(2,2-6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)butylmalonate, tris(2,2,6,6-tetramethylpiperidin-4-yl) nitrilotriacetate, 1,2-bis(2,2,6,6-tetramethyl-3-oxopierazin n-4-yl)ethane, 2,2,4,4-tetramethyl-7-oxa-3,20-diaza-21-oxodispiro- [5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6,6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N",N"'-tetrakis[(4,6-bis(butyl-(2,2,6,6-tetra-methyl-piperidin-4-yl)-amino-s-triazin-2-yl]-1,10-diamino-4,7-diazadecane, octamethylene bis(2,2,6,6-tetramethyl-piperidin-4-carboxylate) and 4,4'-ethylenebis(2,2,6,6-tetra-methylpiperazin-3-one).

19. A composition according to claim 18 wherein component (e) is bis(2,2,6,6-tetramethylpiperidin-4-yl) sebacate, the polycondensation product of 1-(2-hydroxyethyl)-2,2,6,6tetramethyl-4-hydroxypiperidine and succinic acid, the polycondensation product of 2,4-dichloro-6-tertoctylaminos-triazine and 4,4'-hexamethylenebis(amino-2,2,6,6-tetramethylpiperidine) or N,N',N",N"'-tetrakis-[(4,6-bis(butyl(2,2,6,6-tetramethyl- piperidin-4-yl)amino)-s-triazine-2-yl]-1,10-diamino-4,7-diazadecane.

20. A composition according to claim 10 which additionally contains
(f) an effective amount of an organic phosphorus compound or mixture thereof.

21. A composition according to claim 20 wherein component (f) is an organic phosphorus compound selected from the group consisting of triphenyl phosphite, the diphenylalkyl phosphites, the phenyldialkyl phosphites, tris(p-nonylphenyl) phosphite, trilauryl phosphite, trioctadecyl phosphite, 3,9-di(isodecyloxy)-2,4,8,10-tetraoxa-3,9-diphospha[5.5]undecane, tri(4-hydroxy-3,5-di-tert-butylphenyl) phosphite, tris(2,4-di-tertbutylphenyl)phosphite, 3,9-di(2,4-di-tert-butylphenoxy)-2,4,8,10-tetraoxa-3,9-diphospha[5.5]undecane, 3,9-di(2,6-di-tert-butyl-4-methylphenoxy)-2,4,8,10-tetraoxa-3,9-diphospha[5.5]undecane, 3,9-distearyloxytetraoxa-3,9-diphospha-[5.5]undecane, dilauryl phosphite, 3,9-di[2,6-di-tert-butyl-4-(2-(n-octadecyloxycarbonyl)-ethyl)-phenoxy]-2,4,8,10-tetraoxa-3,9-diphospha[5.5]undecane and tetrakis(2,4-di-tert-butylphenyl)-4,4'-bis(diphenylene) phosphonite.

22. A composition according to claim 21 wherein component (f) is tris(2,4-di-tert-butylphenyl) phosphite.

23. A composition according to claim 10 which additionally contains
(c) an effective amount of an alkaline metal salt of a fatty acid or mixture thereof, and
(e) an effective amount of a hindered amine light stabilizer or mixture thereof.

24. A composition according to claim 10 which additionally contains
(c) an effective amount of an alkaline metal salt of a fatty acid or mixture thereof,
(d) an effective amount of a phenolic antioxidant or mixture thereof, and
(e) an effective amount of a hindered amine light stabilizer or mixture thereof.

25. A composition according to claim 10 which additionally contains
(c) an effective amount of an alkaline metal salt of a fatty acid or mixture thereof,
(d) an effective amount of a phenolic antioxidant or mixture thereof, and (f) an effective amount of an organic phosphorus compound or mixture thereof.

26. A composition according to claim 10 which additionally contains
   (c) an effective amount of an alkaline metal salt of a fatty acid or mixture thereof, and
   (f) an effective amount of an organic phosphorus compound or mixture thereof.

27. A composition according to claim 10 which additionally contains
   (e) an effective amount of a hindered amine liht stabilizer or mixture thereof, and
   (f) an effective amount of an organic phosphorus compound or mixture thereof.

28. A composition according to claim 10 which additionally contains
   (c) an effective amount of an alkaline metal salt of a fatty acid or mixture thereof,
   (e) an effective amount of a hindered amine light stabilizer or mixture thereof, and
   (f) an effective amount of an organic phosphorus compound or mixture thereof.

29. A composition according to claim 10 which additionally contains
   (c) an effective amount of an alkaline metal salt of a fatty acid or mixture thereof,
   (d) an effective amount of a phenolic antioxidant or mixture thereof,
   (e) an effective amount of a hindered amine light liner or mixture thereof, and
   (f) an effective amount of an organic phosphorus compound or mixture thereof.

30. A composition according to claim 10 which additionally contains
   (d) an effective amount of a phenolic antioxidant or mixture thereof.

31. A composition according to claim 1 wherein component (b) is N,N-dioctadecylhydroxylamine, N,N-dihexadecylhydroxylamine or a mixture thereof.

* * * * *